United States Patent
Harada et al.

(10) Patent No.: US 11,570,762 B2
(45) Date of Patent: Jan. 31, 2023

(54) USER EQUIPMENT, AND UPLINK TRANSMISSION TIMING ADJUSTMENT METHOD

(71) Applicant: NTT DOCOMO, INC., Tokyo (JP)

(72) Inventors: Hiroki Harada, Tokyo (JP); Tomoya Ohara, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/960,424

(22) PCT Filed: Jan. 12, 2018

(86) PCT No.: PCT/JP2018/000724
§ 371 (c)(1),
(2) Date: Jul. 7, 2020

(87) PCT Pub. No.: WO2019/138559
PCT Pub. Date: Jul. 18, 2019

(65) Prior Publication Data
US 2020/0344751 A1    Oct. 29, 2020

(51) Int. Cl.
*H04W 4/00* (2018.01)
*H04W 72/04* (2009.01)
*H04L 5/14* (2006.01)

(52) U.S. Cl.
CPC ........... *H04W 72/0413* (2013.01); *H04L 5/14* (2013.01); *H04W 72/042* (2013.01)

(58) Field of Classification Search
None
See application file for complete search history.

(56) References Cited

U.S. PATENT DOCUMENTS

| 9,681,382 | B2 * | 6/2017 | Zhang | H04B 7/0456 |
| 2012/0188907 | A1 * | 7/2012 | Dayal | H04W 72/1215 370/254 |
| 2015/0230268 | A1 * | 8/2015 | Chen | H04L 5/0053 370/280 |

(Continued)

FOREIGN PATENT DOCUMENTS

| WO | 2016017715 A1 | 2/2016 |
| WO | 2016017717 A1 | 2/2016 |

OTHER PUBLICATIONS

3GPP TSG RAN meeting #63; RP-140270 "Status Report to TSG" Nokia Corporation; Fukuoka, Japan; Mar. 3-6, 2014 (7 pages).

(Continued)

*Primary Examiner* — Clemence S Han
(74) *Attorney, Agent, or Firm* — Osha Bergman Watanabe & Burton LLP (57) ABSTRACT

A terminal is disclosed that includes a transmitter that performs uplink transmission; and a processor that adjusts timing of the uplink transmission with respect to a downlink reception timing, wherein, when a band of a cell in which uplink transmission is performed is not a predetermined band, the processor adjusts the timing by using a same offset value when a duplex mode of the band of the cell is frequency division duplex (FDD) and when the duplex mode of the band of the cell is time division duplex (TDD). In other aspects, a base station and an uplink transmission timing adjustment method executed by the terminal are also disclosed.

7 Claims, 10 Drawing Sheets

(56) References Cited

U.S. PATENT DOCUMENTS

| | | | | |
|---|---|---|---|---|
| 2016/0014753 | A1* | 1/2016 | Wu | H04B 7/022 |
| | | | | 370/280 |
| 2016/0219547 | A1* | 7/2016 | Seo | H04L 5/14 |
| 2016/0219577 | A1* | 7/2016 | Yang | H04W 72/0413 |
| 2017/0070985 | A1* | 3/2017 | Uchino | H04W 72/0406 |
| 2017/0302419 | A1* | 10/2017 | Liu | H04L 5/0082 |
| 2017/0325248 | A1* | 11/2017 | Mizusawa | H04W 72/04 |
| 2020/0314820 | A1* | 10/2020 | Kim | H04L 5/003 |
| 2020/0367187 | A1* | 11/2020 | Palenius | H04L 5/14 |

OTHER PUBLICATIONS

3GPP TSG RAN WG1 Meeting #76; R1-140553 "Handling of timing advance in TDD-FDD CA" Nokia, NSN; Prague, Czech Republic; Feb. 10-14, 2014 (2 pages).

3GPP TS 38.133 V15.0.0 "3rd Generation Partnership Project; Technical Specification Group Radio Access Network NR; Requirements for support of radio resource management (Release 15)" Dec. 2017 (14 pages).

3GPP TS 38.211 V15.0.0 "3rd Generation Partnership Project; Technical Specification Group Radio Access Network NR; Physical channels and modulation (Release 15)" Dec. 2017 (73 pages).

3GPP TS 36.213 V14.5.0 "3rd Generation Partnership Project; Technical Specification Group Radio Access Network Evolved Universal Terrestrial Radio Access (E-UTRA); Physical layer procedures (Release 14)" Dec. 2017 (462 pages).

International Search Report issued in International Application No. PCT/JP2018/000724, dated Feb. 13, 2018 (5 pages).

Written Opinion issued in International Application No. PCT/JP2018/000724; dated Feb. 13, 2018 (4 pages).

Office Action issued in the counterpart Australian Patent Application No. 2018402444, dated Feb. 17, 2021 (4 pages).

Extended European Search Report issued in European Application No. 18899594.8, dated Jul. 26, 2021 (12 pages).

3GPP TSG-RAN WG1 Meeting #76; R1-140236 "TDM UL transmission for TDD-FDD DL CA-capable UE with single transmitter" MediaTek Inc.; Prague, CZ Rep.; Feb. 10-14, 2014 (4 pages).

Office Action issued in Indian Application No. 202037033260; dated Aug. 23, 2021 (7 pages).

Office Action issued in counterpart Chinese Application No. 201880085622.5 dated Oct. 11, 2021 (20 pages).

Office Action issued in counterpart Japanese Application No. 2019-564252 dated Nov. 30, 2021 (3 pages).

Ericsson; "Even Further Analysis of UE Initial Transmit Timing Requirement" 3GPP TSG RAN WG4 Meeting #85, R4-1713648; Reno, USA, Nov. 27, 2017-Dec. 1, 2017 (7 pages).

Office Action issued in the counterpart Australian Patent Application No. 2018402444, dated Jan. 25, 2022 (6 pages).

\* cited by examiner

Downlink frame i

Uplink frame i $(N_{TA} + N_{TA,offset})T_c$

FIG.3

| Duplex Mode of cell used for uplink transmission | $N_{TA\ offset}$ | |
|---|---|---|
| FDD in FR1 or FR2 | 0 (Note) | |
| TDD in FR1 | 25560 | ABOUT 13 us |
| TDD in FR2 | 13763 | ABOUT 7 us |
| Note: Regardless of whether LTE-NR coexistence is configured or not in FR1 | | |

USER EQUIPMENT, AND UPLINK TRANSMISSION TIMING ADJUSTMENT METHOD

TECHNICAL FIELD

The present invention relates to a user equipment in a radio communication system.

BACKGROUND ART

Currently, radio services by LTE (including LTE-Advanced) are widely provided. In 3GPP, in order to realize further increase in system capacity from LTE, further increase in data transmission speed, further reduction in delay in the radio section, study and specification of a radio communication scheme called 5G is progressing. In 5G, various technologies are being studied to satisfy the requirement that the delay of the radio section be 1 ms or less while achieving a throughput of 10 Gbps or more. Radio access technology supporting 5G is called NR (New Radio).

In LTE, uplink transmission timing control (called TA (Timing Advance) control) is performed so that difference in reception timing of uplink signals received from a plurality of user equipments falls within a predetermined time in a base station.

RELATED ART DOCUMENT

Patent Document

[PATENT DOCUMENT 1] 3GPP TS 38.211 V15.0.0
[PATENT DOCUMENT 2] 3GPP TS 38.133 V15.0.0
[PATENT DOCUMENT 3] 3GPP TS 36.213 V14.5.0

SUMMARY OF THE INVENTION

Problem to be Solved by the Invention

NR also assumes that uplink transmission timing control similar to that of LTE is performed. However, in uplink transmission timing control in LTE, it is necessary to decide whether or not to apply an offset value to be added to a value of TA according to duplex modes, so there is a problem in that control of user equipments and base stations becomes complicated. Particularly, it is not preferable that control becomes complicated in NR where high speed operation is required.

The present invention has been made in view of the above points, and an object of the present invention is to provide a technique for enabling uplink transmission timing control without being conscious of a duplex mode in a radio communication system.

Means for Solving the Problem

According to an embodiment of the present invention, there is provided a user equipment in a radio communication system including a base station and the user equipment, including:

a signal transmission unit that transmits an uplink signal to the base station;

a signal reception unit that receives a downlink signal from the base station; and a timing adjustment unit that performs timing control to shift a transmission timing of an uplink signal to be transmitted from the signal transmission unit forward with respect to a reception timing of a downlink signal received by the signal reception unit, wherein the timing adjustment unit executes the timing control in a serving cell using an offset value independent of a duplex mode of the serving cell.

Effect of the Present Invention

According to an embodiment of the present invention, there is provided a technique for enabling uplink transmission timing control without being conscious of a duplex mode in a radio communication system.

EMBODIMENTS FOR CARRYING OUT THE INVENTION

In the following, embodiments of the present invention are described with reference to figures. The embodiments described below are merely examples, and the embodiments to which the present invention is applied are not limited to the embodiments below.

It is assumed that the radio communication system of the present embodiment supports at least NR communication scheme. Further, when the radio communication system of the present embodiment operates, for example, in order to perform an operation not defined by the specification of NR, it is possible to use the technology defined by the existing LTE as appropriate.

(System Configuration)

Figure 1:
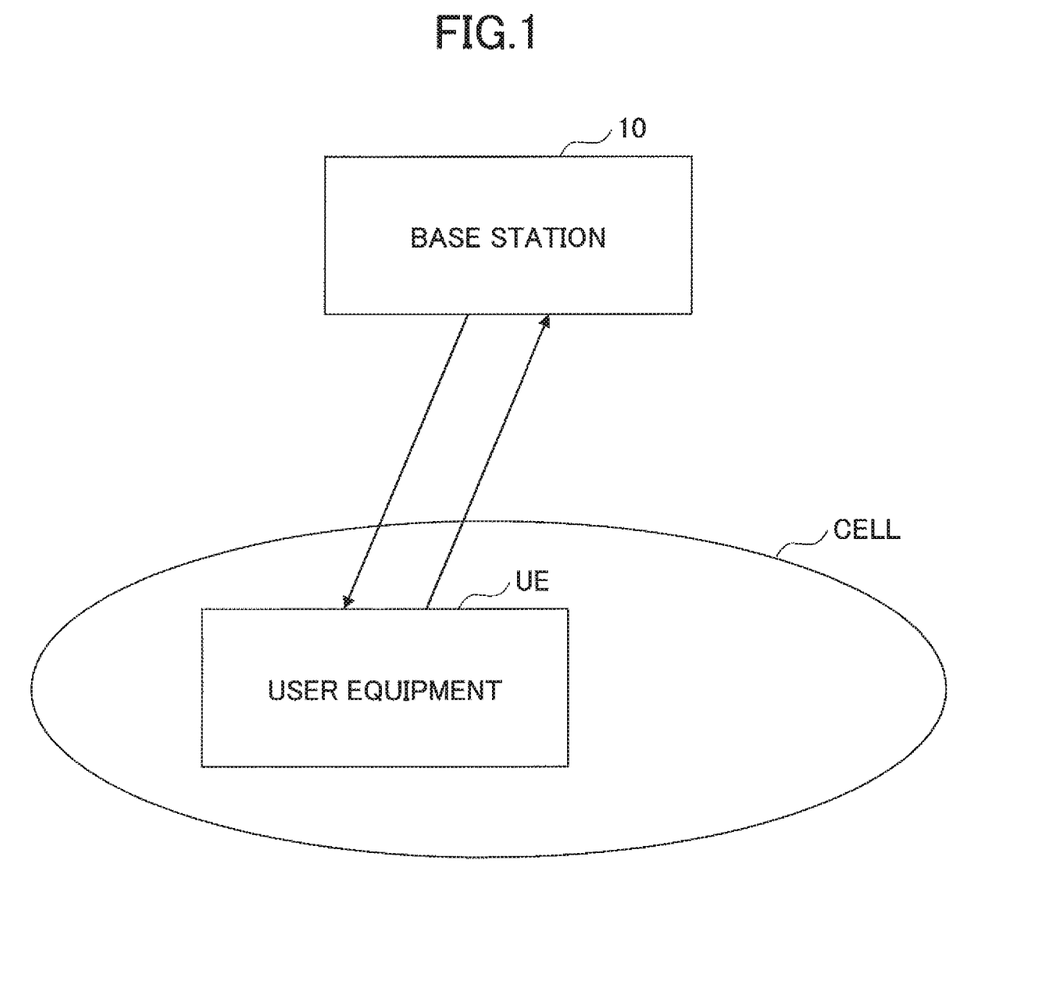
FIG. 1 is a block diagram of a radio communication system in an embodiment of the present invention.

FIG. 1 is a diagram showing a configuration example of a radio communication system according to the present embodiment. As shown in FIG. 1, the radio communication system according to the present embodiment includes a base station 10 forming a cell and a user equipment UE. In the radio communication system according to the present embodiment, in general, there are many user equipments UE in addition to one user equipment UE shown in FIG. 1. In FIG. 1, one user equipment UE is shown as an example.

Both the base station 10 and the user equipment UE have the function of NR. However, both the base station 10 and the user equipment UE may be provided with the function of the LTE in addition to the NR function, or may include only the NR function. Thereafter, NR user equipment may be described as NR-UE and LTE user equipment may be described as LTE-UE in some cases. The user equipment UE of the present embodiment is an example of NR-UE.

The radio frame configuration (frame, slot, subframe, etc.) used in the present embodiment is, for example, the NR radio frame configuration disclosed in Non-Patent Document 1. However, it is not limited to this.

Further, the signal waveform used in the radio communication system according to the present embodiment may be OFDMA or SC-FDMA in both uplink (UL) and downlink (DL). However, in the present embodiment, it is assumed to use SC-FDMA in UL, and use OFDMA in DL.

(On Ta Control)

In the present embodiment, since the TA (Timing Advance) control is targeted, a basic operation related to TA (Timing Advance) control will be described first.

The base station 10 performs FFT collectively on uplink signals transmitted from different user equipments UE in the cell to demodulate the signals. However, signal propagation delay (radio characteristic) of each user equipment UE is different. Therefore, if each user equipment UE in the cell transmits an uplink signal in accordance with the reception timing of the downlink signal from the base station 10, in the base station 10, uplink signals of user equipments UE are received at different timings. Thus, the base station 10 cannot perform FFT at a desired timing. Therefore, the base station 10 performs control to adjust transmission timing of uplink signals of each user equipment UE such that deviation of reception timing in the base station 10 falls within a predetermined time. This is called TA control. Specifically, the base station 10 measures a difference between desired uplink signal reception timing and actual uplink signal reception timing and instructs each user equipment UE to shift uplink signal timing forward by the difference. Note that it is possible to transmit an uplink transmission timing adjustment instruction (called TA command) from the base station 10 by a random access procedure or the like.

Figure 2:
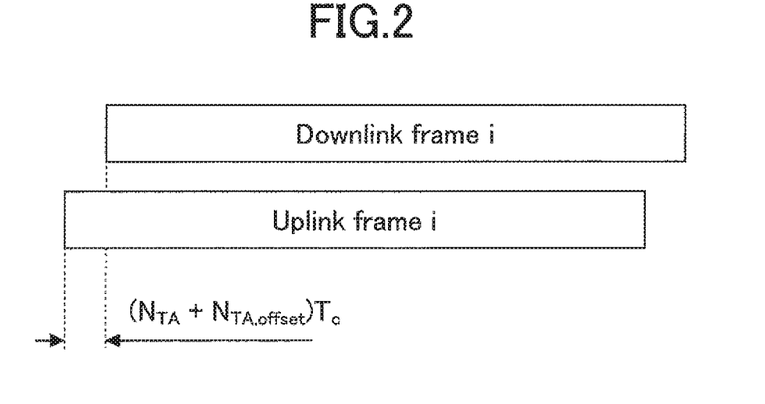
FIG. 2 is a diagram showing an example of uplink and downlink frame timing.

FIG. 2 (excerpt from Non-Patent Document 1) shows an example of TA control, in which an i-th UL frame is shifted forward with respect to an i-th DL frame by a time of $(N_{TA}+N_{TA\ offset})$ Tc. $N_{TA}$ is a value of an uplink transmission timing adjustment instruction notified from the base station 10, and $N_{TA\ offset}$ is a predetermined offset value. Tc is a predetermined value.

Also, in the present embodiment, when using CA (carrier aggregation) (including CA in each CG in DC), CCs (component carriers) configured in the user equipment UE are grouped to CC groups each having almost the same radio characteristics, and uplink transmission timing adjustment control is performed for each CC group (TAG: Timing Advance Group). The TAG is a group of cells using the same uplink transmission timing.

In addition, in the radio communication system according to the present embodiment, as duplex modes, two duplex modes can be used, which are a frequency division duplex (FDD) mode and a time division duplex (TDD) mode. In the FDD mode, uplink (UL) communication and downlink (DL) communication are executed in mutually different frequency bands, and in the TDD mode, the UL communication and the DL communication use the same frequency band, and the UL communication and the DL communication are separated by time. For example, a duplex mode is defined for each band, and the user equipment UE performs operation of TDD or FDD according to a band of a cell (serving cell) in which the user equipment UE is located.

Figure 3:
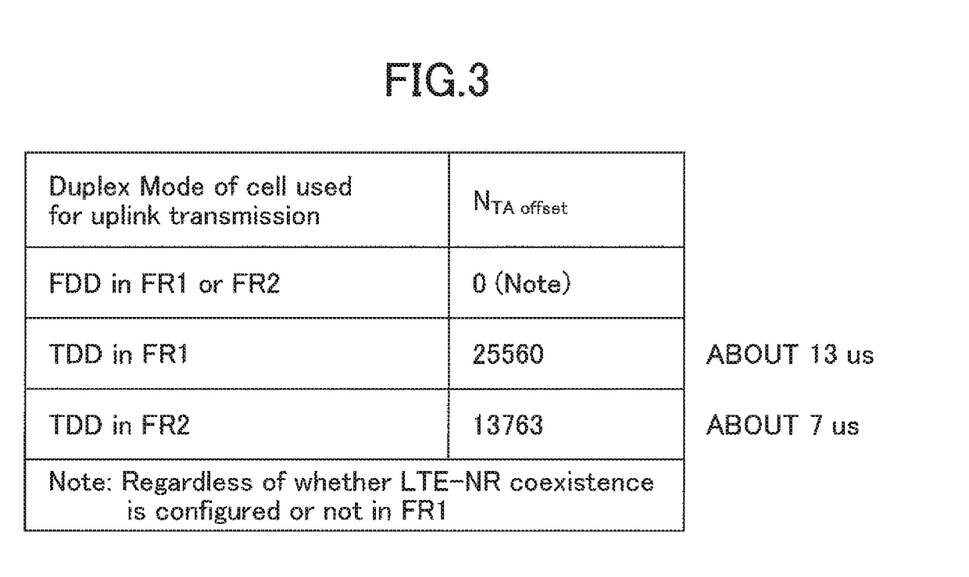
FIG. 3 is a diagram showing an example of a value of $N_{TA\ offset}$.

In the prior art, for example as shown in FIG. 3 (excerpt from Non-Patent Document 2), the value of $N_{TA\ offset}$ to be applied in TA control varies depending on the duplex mode. Note that, in the case of TDD, the value of $N_{TA\ offset}$ is added because it takes time to switch between UL communication and DL communication.

Figure 4:
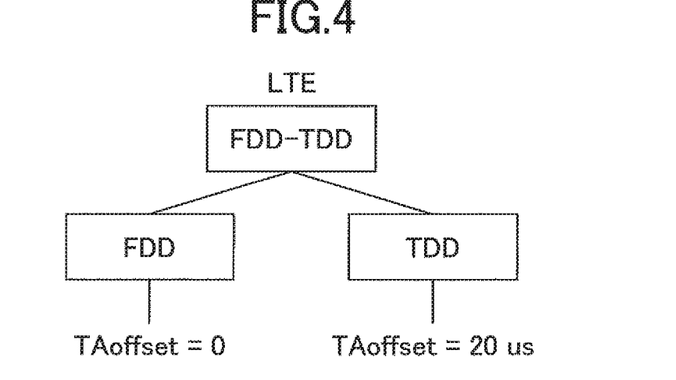
FIG. 4 is a diagram showing TAoffset in LTE.
Figure 5:
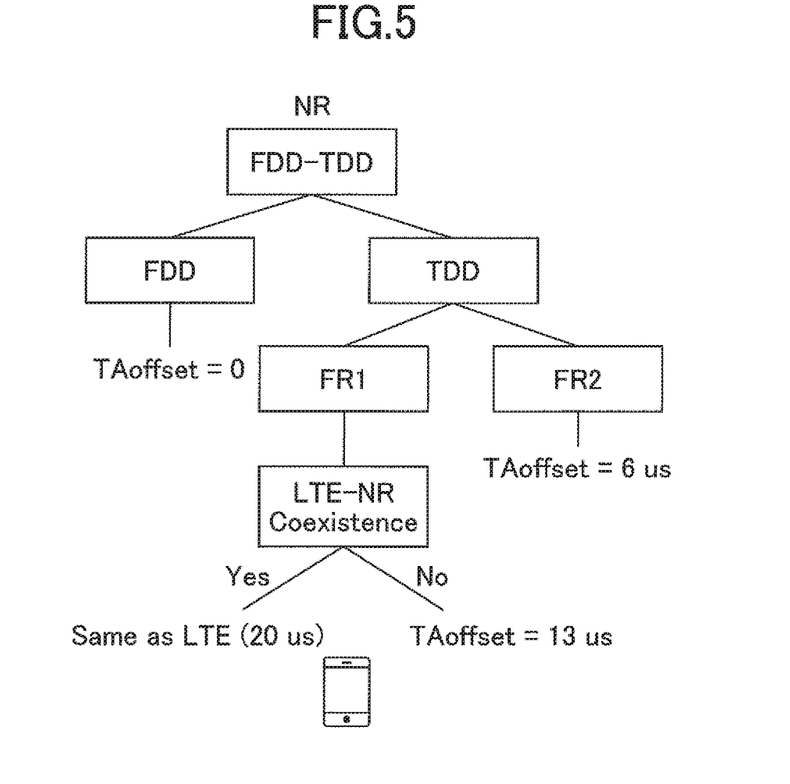
FIG. 5 is a diagram showing TAoffset in NR.

Also in LTE, the value of $N_{TA\ offset}$ of TDD is defined so that TAoffset is about 20 μs. TAoffset in LTE is shown in FIG. 4. Also, as shown in FIG. 3, in existing NR, the value of $N_{TA\ offset}$ of TDD is specified such that TAoffset is about 13 μs in FR 1 (frequency range 1), and is specified such that TAoffset is about 7 μs in FR2. A summary of these is shown in FIG. 5. In FIG. 5, "Yes" in the LTE-NR coexistence indicates a band in which an LTE-UE and an NR-UE can coexist. In this case, for example, it can be considered that TA offset is set to 20 μs for both of the LTE-UE and the NR-UE.

With respect to CA and duplex mode, it is possible to perform CA using CCs of different duplex modes. For convenience, CA using CCs of different duplex modes is described as TDD-FDD CA.

Figure 6:
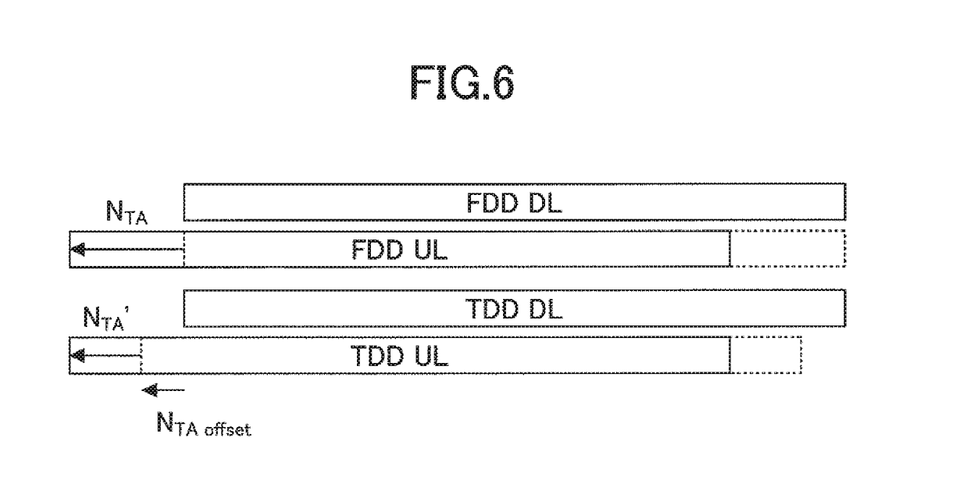
FIG. 6 is a diagram for explaining frame timing in UL CA.

As specified in the non-patent document 3, in the prior art, in TDD-FDD CA of LTE, as shown in FIG. 6, when the duplex mode of a PCell (or a PSCell) is TDD, the UL timing of an SCell which is FDD is adjusted to the UL timing of TDD. Also, when the duplex mode of a PCell (or a PSCell) is FDD, the UL timing of an SCell which is TDD is adjusted to the UL timing of FDD. As specified in the non-patent document 3, in the prior art, in an sTAG which includes neither PCell nor PSCell, when TDD and FDD coexist, $N_{TA\ offset}=624$ is applied to each cell regardless of FDD or TDD.

In the case of performing operation according to the conventional technique, TA control on an FDD cell with respect to a UE under a base station where a FDD cell and a TDD cell collocate is as follows.

When only non-CA UE exists: For each UE, "time to compensate for propagation delay from a base station" is set as $N_{TA}$.

When only FDD-TDD CA UE (FDD PCell) exists: for each UE, "time to compensate for propagation delay from a base station+$N_{TA\ offset}$ time in TDD" is set as $N_{TA}$.

When only FDD-TDD CA UE (TDD PCell) exists: "Time to compensate for propagation delay from a base station" is set for each UE as $N_{TA}$, and each UE performs, in a FDD SCell, UL transmission timing control in which timing is shifted forward additionally by the time of $N_{TA\ offset}$ in TDD so as to adjust timing to the TDD side.

When only FDD-TDD CA UE (secondary TAG) exists: "Time to compensate for propagation delay from a base station" is set for each UE as $N_{TA}$, and each UE performs, in a FDD SCell, UL transmission timing control in which timing is shifted forward additionally by the time of $N_{TA\ offset}$ in TDD.

When the above-mentioned UEs coexist: For each UE, "time to compensate for propagation delay from the base station+$N_{TA\ offset}$ time in TDD" is set as $N_{TA}$.

As described above, in the conventional control of determining the $N_{TA\ offset}$ according to the duplex mode, control of the base station/UE becomes complicated. Also, a case where the value of TA directly corresponds to the distance (propagation delay time) from the base station and a case where the value of TA does not directly correspond to the distance (propagation delay time) from the base station coexist. Thus, there is a possibility that the application becomes complicated for estimating distance between the base station and the terminal using the value of TA.

Thus, in the present embodiment, $N_{TA\ offset}$ independent of the duplex mode is specified, so that the user equipment UE executes UL transmission timing control using the specified $N_{TA}$ offset. The user equipment UE may retain the specified $N_{TA\ offset}$ fixedly or the specified $N_{TA\ offset}$ may be preconfigured in the user equipment UE (example: obtain the value from a server when purchasing the UE, and the like), or the specified $N_{TA\ offset}$ may be configured to the user equipment UE from the base station 10 by upper layer signaling.

More specific examples will be described below as example 1 and example 2.

Example 1

Figure 7:
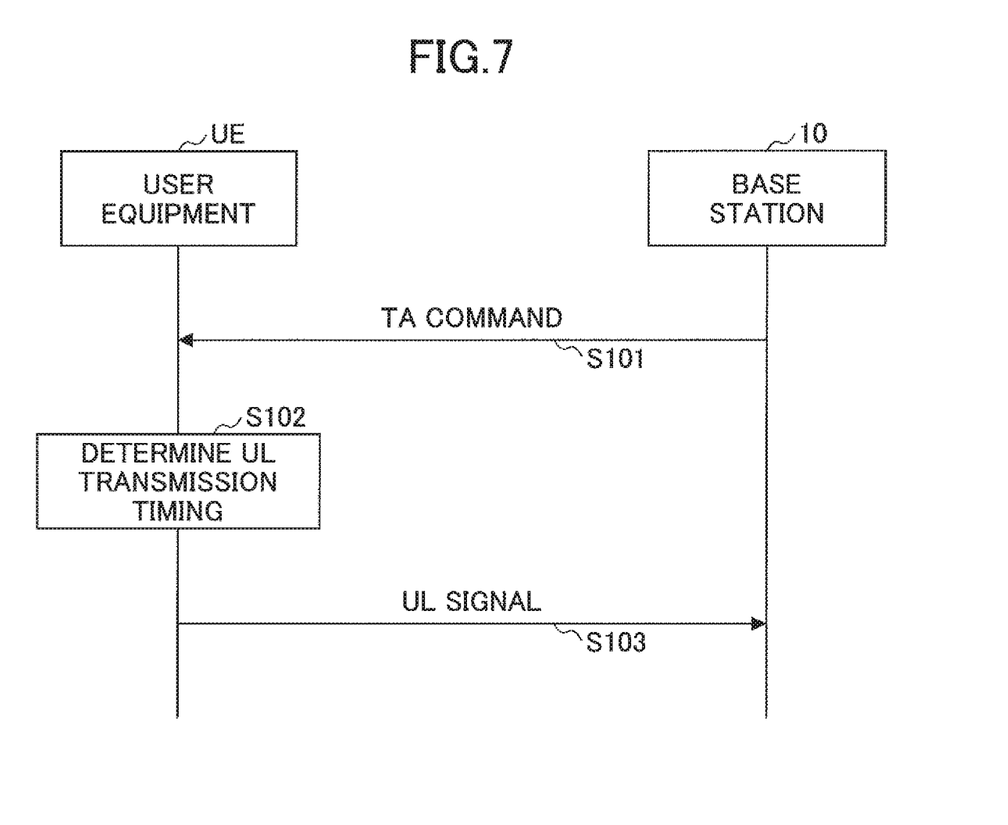
FIG. 7 is a diagram for explaining an operation example in a radio communication system.

A basic operation example in the example 1 will be described with reference to FIG. 7. The operation example shown in FIG. 7 is also applied to the example 2.

The user equipment UE resides in a certain cell provided by the base station 10 and receives a TA command from the base station 10 (S101). The TA command is, for example, a TA command included in a random access response received after transmitting a random access preamble. The TA command is a value of the $N_{TA}$ or a value corresponding to the $N_{TA}$ in the UL transmission timing control shown in FIG. 2. Hereinafter, for convenience sake, it is assumed that the TA command received in S101 is the value of $N_{TA}$.

The duplex mode of the cell (serving cell) where the user equipment UE resides is TDD or FDD. In S102, the user equipment UE determines the UL transmission timing by using a specific $N_{TA\ offset}$ without depending on the duplex mode of the cell. That is, as shown in FIG. 2, in the case where the user equipment UE receives a signal of the i-th DL frame at a certain timing (here, assumed to be the time T), the user equipment UE transmits a signal of the i-th UL frame at a timing of "T−($N_{TA}$+$N_{TA\ offset}$) Tc".

The $N_{TA\ offset}$ in the example 1 is a value defined as a value for TDD in FIG. 3. That is, if the band of the serving cell is a band corresponding to FR1, the user equipment UE applies $N_{TA\ offset}$=25560 (about 13 μs) without depending on the duplex mode.

If the band of the serving cell is a band corresponding to FR2, the user equipment UE applies $N_{TA\ offset}$=13763 (about 7 μs) without depending on the duplex mode. These values of $N_{TA\ offset}$ are examples, and it is not limited to these values. Further, for example, the user equipment UE can grasp a band of the serving cell from system information notified from the base station 10 in the serving cell.

Figure 8:
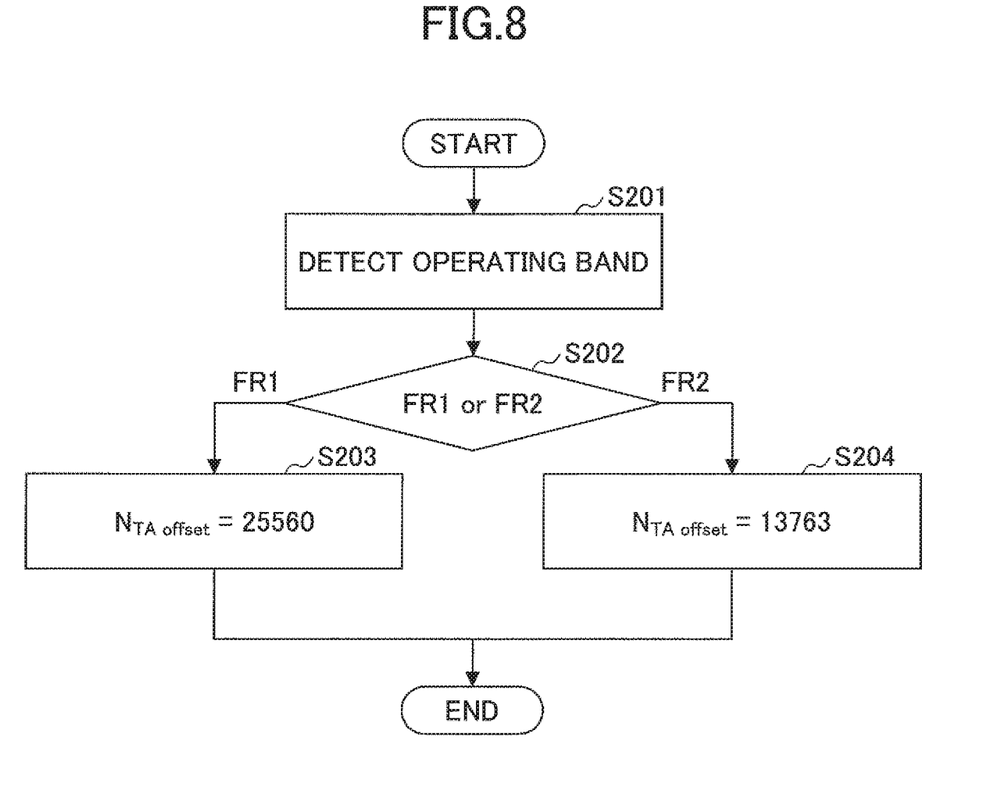
FIG. 8 is a flowchart when selecting one of $N_{TA\ offset}$ for FR1 and $N_{TA\ offset}$ for FR2.

FIG. 8 is a flowchart showing processing when the user equipment UE determines $N_{TA\ offset}$ to apply in the serving cell.

In S201 of FIG. 8, the user equipment UE detects a band operating in the serving cell. In S202, the user equipment UE determines whether the detected band corresponds to FR1 or FR2. If the detected band is FR1, the user equipment UE applies $N_{TA\ offset}$=25560 (S203), and if the detected band is FR2, the user equipment UE applies $N_{TA\ offset}$=13763 (S204).

In some cases, the base station 10 provides a plurality of cells, and the base station 10 may configure the user equipment UE with a CA (here, UL CA). Even in that case, basically the operations shown in FIGS. 7 and 8 are executed for each cell. However, in the case where a plurality of cells relating to CA form a TAG, a TA command ($N_{TA}$) may be notified to the user equipment UE only in a specific cell, and the user equipment UE may use the $N_{TA}$ also in other cells.

Figure 9:
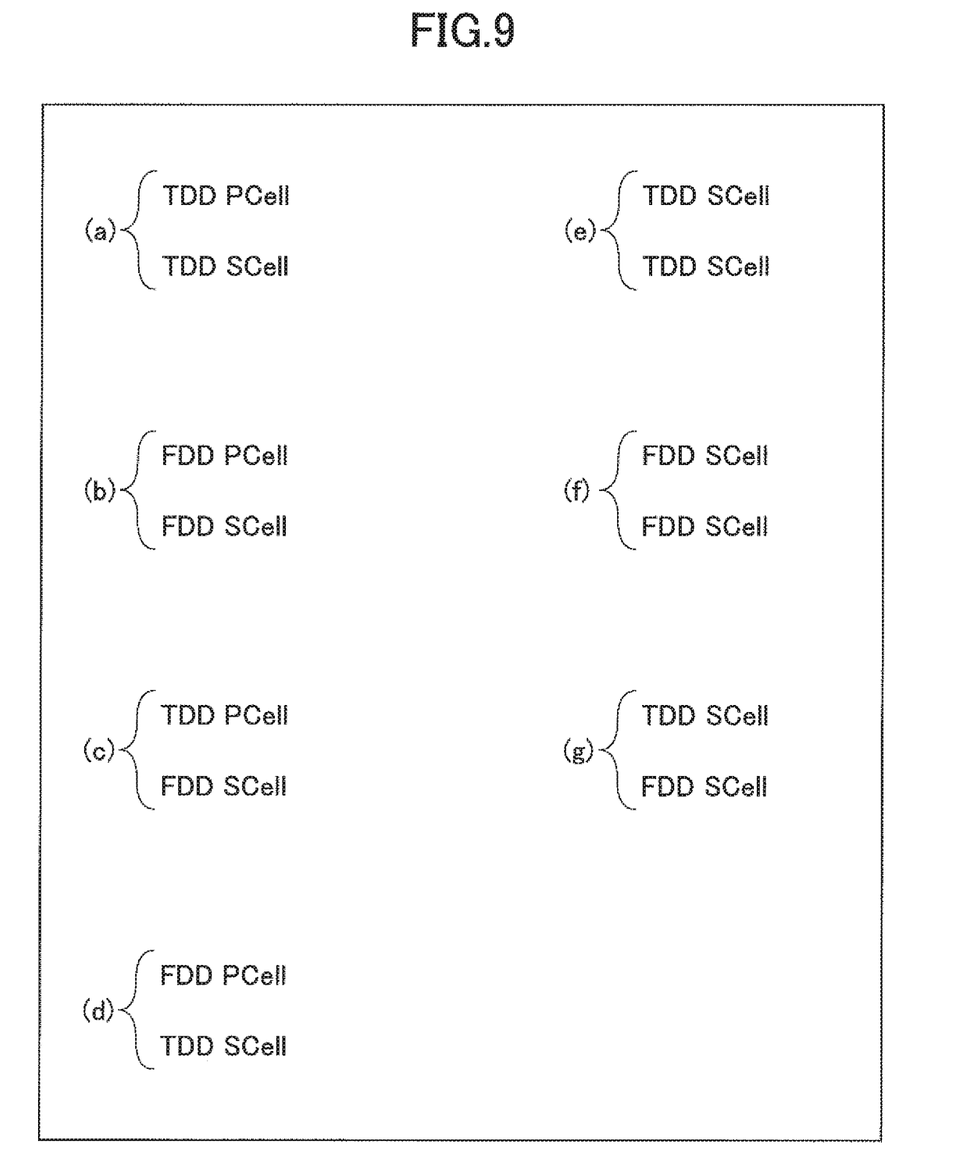
FIG. 9 is a diagram showing a pattern of CA(TAG)

As an example, there may be patterns as shown in FIG. 9 in the case where a CA by two cells provided by the base station 10 is configured in the user equipment UE. In the example 1, in any of the patterns shown in FIG. 9, in each serving cell constituting the CA, the user equipment UE applies, as the $N_{TA\ offset}$ for determining UL transmission timing, $N_{TA\ offset}$=25560 (about 13 μs) if the band of the serving cell is a band corresponding to FR1, and applies $N_{TA\ offset}$=13763 (about 7 μs) if the band of the serving cell is a band corresponding to FR2.

In the case where the user equipment UE is configured with a CA by a cell of a band of FR1 and a cell of a band of FR2, different values of $N_{TA\ offset}$ may be configured between cells as described above. That is, the UL transmission timing of FR1 and the UL transmission timing of FR2 need not be matched.

In the conventional technique in LTE, in the case where a TAG is configured by a pattern (d) of FIG. 9, the user equipment UE does not apply $N_{TA\ offset}$ in the PCell (FDD) (that is, $N_{TA\ offset}$=0), and the user equipment UE performs adjustment to adjust UL timing to UL timing of the PCell (FDD) in the SCell (TDD). Also, the base station 10 configures the user equipment UE with, as $N_{TA}$, "time for compensating for the propagation delay from the base station+ the time of $N_{TA\ offset}$ in the TDD". On the other hand, according to the processing in the example 1 (the same applies to example 2), such complicated control considering the duplex mode is unnecessary.

In the example 1, there is a case where the base station 10 operates a band (LTE-NR coexistence band) in which both the LTE-UE and the NR-UE can be located. That is, one or more LTE-UEs and one or more NR-UEs may reside in the cell of the band. Note that the user equipment of the present embodiment is an NR-UE.

In the cell of the LTE-NR coexistence band, if the LTE-UE applies $N_{TA\ offset}$=39936 (about 20 μs) and the NR-UE applies $N_{TA\ offset}$=25560 (about 13 μs), there is a possibility that timings of received UL signals in the base station 10 are not aligned.

Thus, in the present embodiment, if the band of the serving cell is the LTE-NR coexistence band, the user equipment UE applies $N_{TA\ offset}$=39936 (about 20 μs) assumed to be used by the LTE-UE, if the band of the serving cell is not the LTE-NR coexistence band, the user equipment UE may apply the above-mentioned value (example: $N_{TA\ offset}$=25560 (about 13 μs)).

For example, the base station 10 includes information indicating whether or not the band of the serving cell is an LTE-NR coexistence band in system information (eg, RMSI (remaining minimum system information)) broadcast in the serving cell. In this case, the user equipment UE can determine whether or not the band of the serving cell is the LTE-NR coexistence band by reading the system information.

Further, the user equipment UE detects a synchronization raster indicating a frequency position of a synchronization signal to grasp the band (band number), so that the user equipment UE may grasp whether the band is the LTE-NR coexistence band or not. Note that it is assumed that the user equipment UE knows in advance correspondence between synchronization rasters and band numbers, and whether or not it is the LTE-NR coexistence band for each band number.

Figure 10:
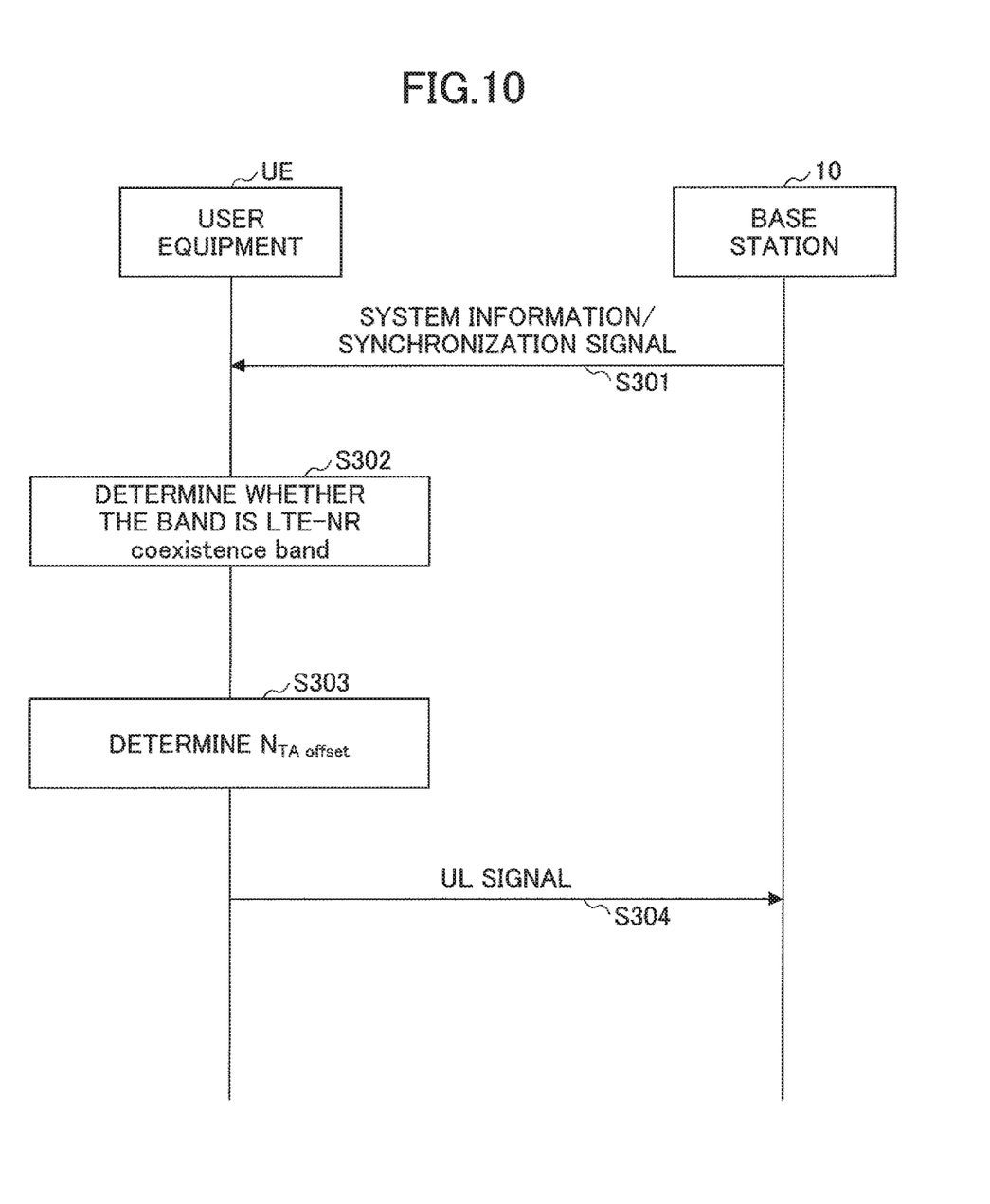
FIG. 10 is a diagram for explaining an operation example related to LTE-NR coexistence band.

An operation example of the user equipment UE will be described with reference to FIG. 10 in a case where $N_{TA\ offset}$ is switched depending on whether or not the serving cell band is the LTE-NR coexistence band.

In S301, the user equipment UE receives system information or a synchronization signal from the base station 10. In S302, as described above, the user equipment UE determines whether or not the band of the serving cell is the LTE-NR coexistence band based on the system information or the synchronization signal.

In step S303, the user equipment UE determines an $N_{TA\ offset}$ to apply according to the determination result in step S302. Specifically, for example, when the band of the serving cell is the LTE-NR coexistence band, the user equipment UE determines to use $N_{TA\ offset}$=39936 (about 20 μs), and when the serving cell band is not the LTE-NR coexistence band, the user equipment UE determines to use $N_{TA\ offset}$=25560 (about 13 μs).

In S304, the user equipment UE transmits an UL signal at an UL transmission timing to which the $N_{TA\ offset}$ determined in S303 is applied.

Example 2

In the example 2, the user equipment UE applies fixed $N_{TA\ offset}$=39936 (about 20 μs) without depending on the band of the serving cell.

However, in the example 2, when the serving cell is an LTE-NR coexistence band of LTE-FDD and NR, the UE of LTE-FDD applies $N_{TA\ offset}$=0. Therefore, if the user equipment UE (NR-UE) applies $N_{TA\ offset}$=39936 (about 20 μs) also in this case, there is a possibility in that reception timings of UL signals are not aligned in the base station 10.

Therefore, in the example 2, the user equipment UE may switch the value of NA offset depending on whether or not the band of the serving cell is the LTE-NR coexistence band of LTE-FDD and NR.

Figure 11:
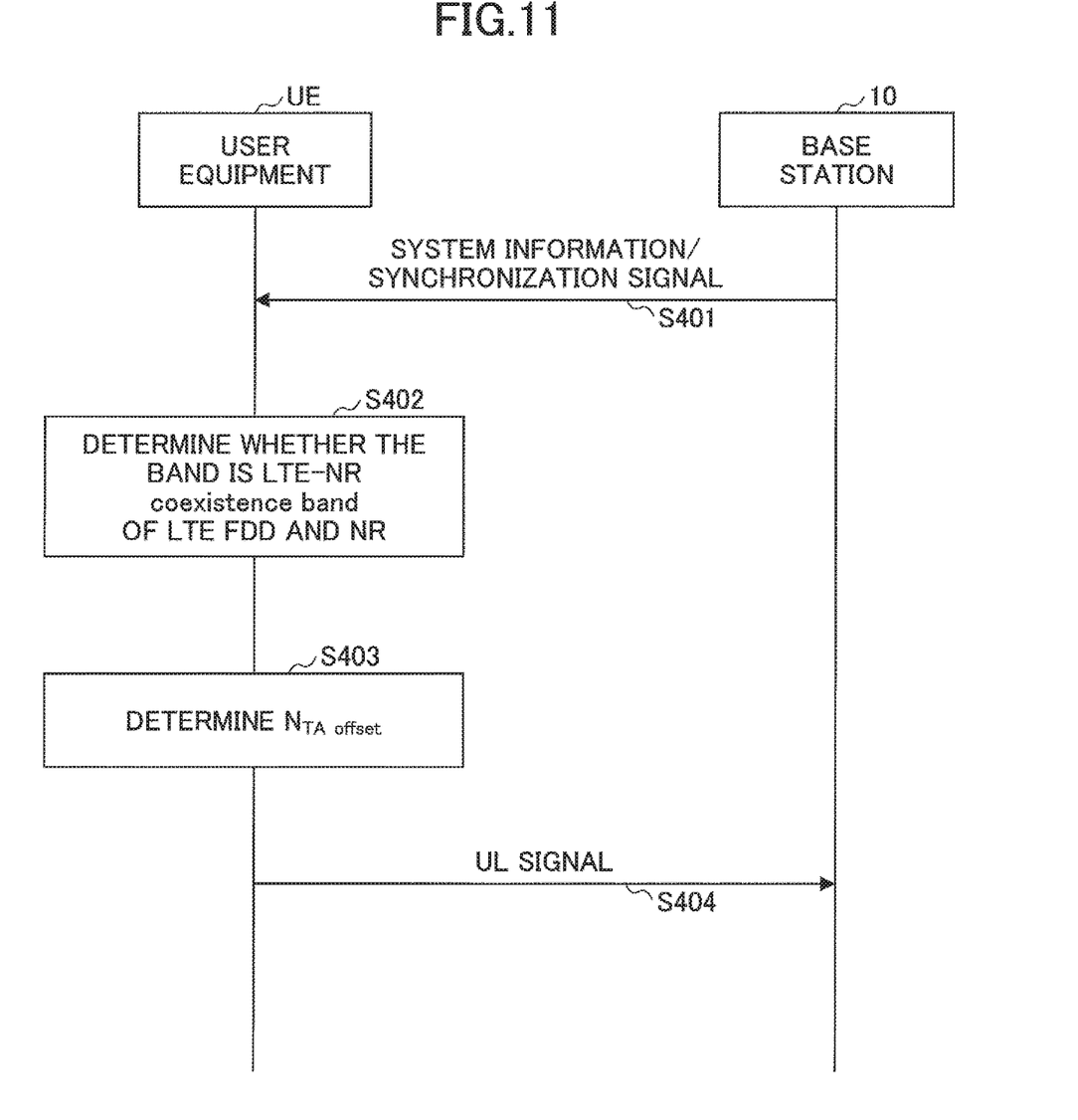
FIG. 11 is a diagram for explaining an operation example related to LTE-NR coexistence band.

Whether or not the band of the serving cell is the LTE-NR coexistence band of LTE-FDD and NR can be ascertained based on system information or a synchronization signal similarly to the example 1. FIG. 11 shows a flow of this case.

In step S401, the user equipment UE receives system information or a synchronization signal from the base station 10. In step S402, based on the system information or the synchronization signal, the user equipment UE determines whether or not the band of the serving cell is the LTE-NR coexistence band of LTE-FDD and NR.

In step S403, the user equipment UE determines $N_{TA\ offset}$ to apply according to the determination result in step S402. Specifically, for example, when the band of the serving cell is the LTE-NR coexistence band of LTE-FDD and NR, the user equipment UE determines $N_{TA\ offset}$=0. When the band of the serving cell is not the LTE-NR coexistence band of LTE-FDD and NR, the user equipment UE determines to use $N_{TA\ offset}$=39936 (about 20 μs).

In step S404, the user equipment UE transmits an UL signal at an UL transmission timing to which the $N_{TA\ offset}$ determined in step S403 is applied.

As described above, according to the technique of the present embodiment described in the examples 1 and 2, the user equipment UE can control UL transmission timing without being aware of the duplex mode. Also, the base station 10 can control the TA command without being aware of the CA state and the like of a connecting user equipment UE.

Further, according to the technique of the present embodiment, since it is clear that a predetermined value is added to the value of TA in common for all UEs, correction in an application such as base station-terminal distance estimation is also easy.

(Apparatus Configuration)

Next, a functional configuration example of the user equipment UE and the base station 10 that execute process operations explained so far will be described. The user equipment UE and the base station 10 have all the functions described in the present embodiment. However, the user equipment UE and the base station 10 may have only some of the functions of all the functions described in this embodiment. For example, the user equipment UE may have the functions of both of the examples 1 and 2, or may have any one of the functions of the examples 1 and 2.

<User Equipment>

Figure 12:
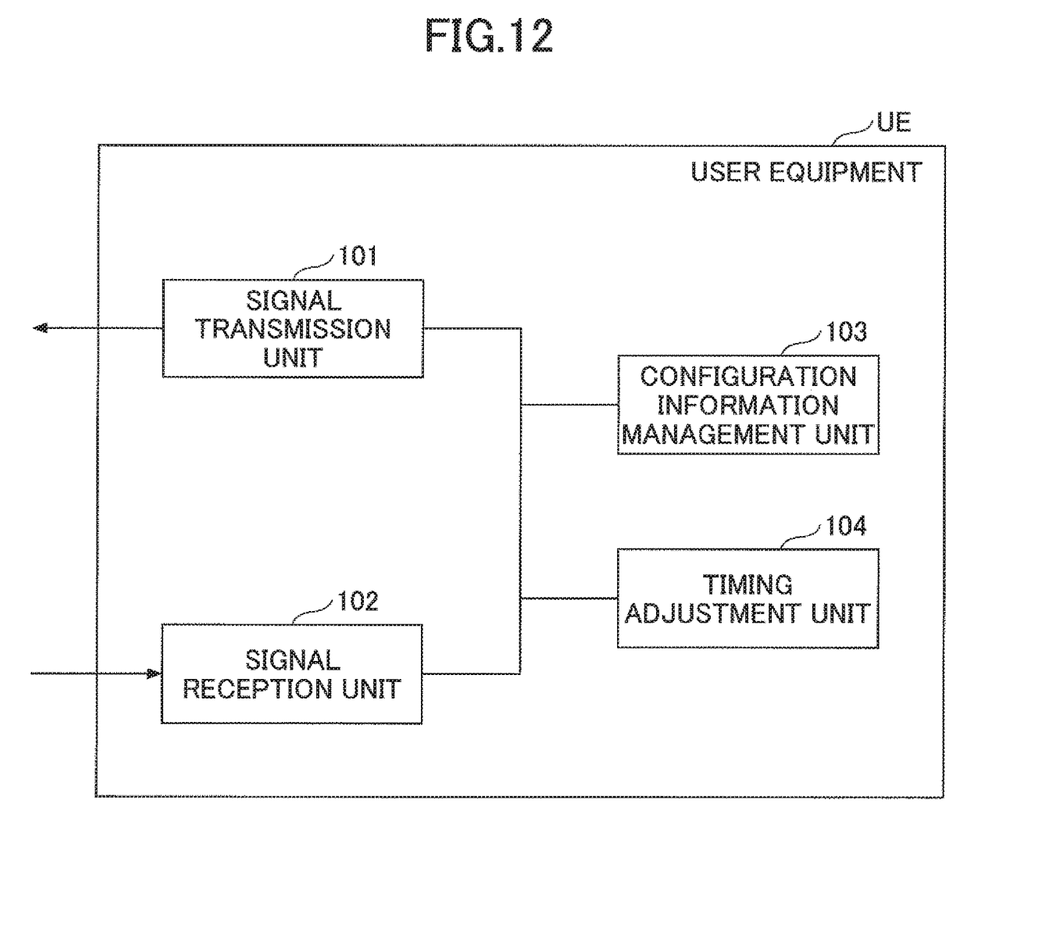
FIG. 12 is a diagram showing an example of a functional configuration of a user equipment according to an embodiment.

FIG. 12 is a diagram showing an example of the functional configuration of the user equipment UE. As shown in FIG. 12, the user equipment UE includes a signal transmission unit 101, a signal reception unit 102, a configuration information management unit 103, and a timing adjustment unit 104. The functional configuration shown in FIG. 12 is only an example. As long as the operation according to the present embodiment can be executed, any division and any names can be used for the function division and the name of the functional units. The signal transmission unit 101 may be referred to as a transmitter and the signal reception unit 102 may be referred to as a receiver.

The signal transmission unit 101 generates a transmission signal from transmission data and transmits the transmission signal by radio. The signal reception unit 102 receives various signals by radio and acquires a signal of a higher layer from the received signals of the physical layer. The configuration information management unit 103 stores various kinds of pieces of configuration information received from the base station 10 by the signal reception unit 102 and preconfigured configuration information. An example of the configuration information is the value of $N_{TA\ offset}$. The timing adjustment unit 104 executes processing related to the uplink transmission timing control described in the present embodiment.

For example, the signal transmission unit 101 transmits an uplink signal to the base station. The signal reception unit 102 receives a downlink signal from the base station. The timing adjustment unit 104 performs timing control to shift a transmission timing of an uplink signal to be transmitted from the signal transmission unit forward with respect to a reception timing of a downlink signal received by the signal reception unit. The timing adjustment unit 104 executes the timing control in a serving cell using an offset value independent of a duplex mode of the serving cell. For example, when a frequency range of a band of the serving cell is a first range, the timing adjustment unit 104 uses a first value as the offset value. When a frequency range of a band of the serving cell is a second range, the timing adjustment unit 104 uses a second value as the offset value.

The timing adjustment unit 104 determines whether the band of the serving cell is a predetermined band or not based on system information or a synchronization signal transmitted from the base station, and determines the offset value to use depending on whether the band of the serving cell is a predetermined band or not. LTE-NR coexistence band is an example of the predetermined band.

The predetermined band is a band that can be used by each of a user equipment supporting a first radio access technology and a user equipment supporting a second radio access technology. LTE is an example of the first radio access technology and NR is an example of the second radio access technology.

<Base Station 10>

Figure 13:
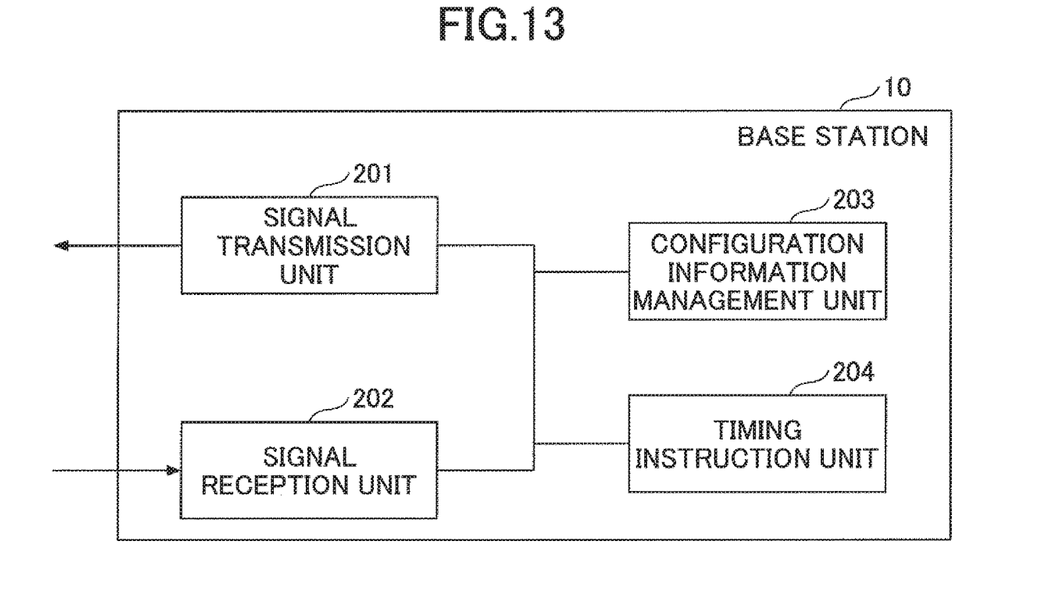
FIG. 13 is a diagram showing an example of a functional configuration of a base station 10 according to an embodiment.

FIG. 13 is a diagram showing an example of a functional configuration of the base station 10. As shown in FIG. 13, the base station 10 includes a signal transmission unit 201, a signal reception unit 202, a configuration information management unit 203, and a timing instruction unit 204. The functional configuration shown in FIG. 13 is only an example. As long as the operation according to the present embodiment can be executed, any division and any names can be used for the function division and the name of the functional units. The signal transmission unit 201 may be referred to as a transmitter and the signal reception unit 202 may be referred to as a receiver.

The signal transmission unit 201 includes a function of generating a signal to be transmitted to the user equipment UE side and transmitting the signal by radio. The signal reception unit 202 includes a function of receiving various signals transmitted from the user equipment UE and acquiring information of a higher layer, for example, from the received signal. The signal transmission unit 201 includes a function of notifying the user equipment UE whether or not the band of the serving cell is a predetermined band by system information or a synchronization signal.

The configuration information management unit 203 stores various kinds of configuration information to be transmitted to the user equipment UE, various kinds of configuration information received from the user equipment UE, and preconfigured configuration information. The timing instruction unit 204 includes a function of generating a TA command and transmitting it via the signal transmission unit 201.

<Hardware Configuration>

The above block diagrams (FIGS. 12 and 13) illustrate the blocks of the functional units. The functional blocks (constituent parts) are implemented by an arbitrary combination of hardware and/or software. A device of implementing each functional block is not particularly limited. In other words, each functional block may be implemented by one device which is physically and/or logically combined or may be implemented by a plurality of devices, that is, two or more devices which are physically and/or logically separated and are directly and/or indirectly connected (for example, a wired and/or wireless manner).

Figure 14:
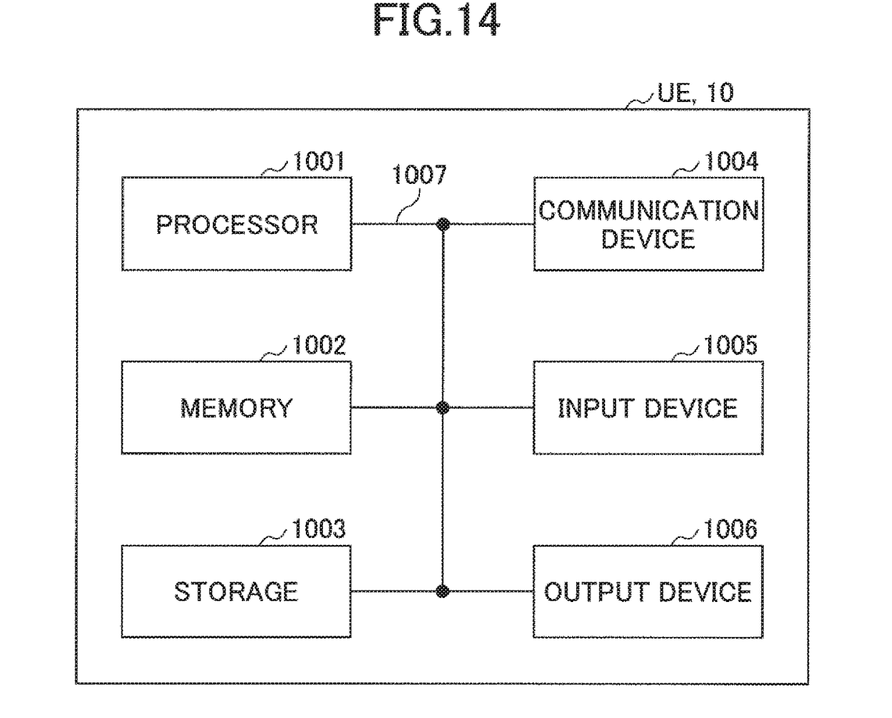
FIG. 14 is a diagram showing an example of a hardware configuration of the base station 10 and the user equipment UE according to an embodiment.

For example, each of the base station 10 and the user equipment UE according to one embodiment of the embodiment of the present invention may function as a computer that performs the process according to the present embodiment. FIG. 14 is a diagram illustrating an example of a hardware configuration of each of the base station 10 and the user equipment UE according to one embodiment of the embodiment of the present invention. As illustrated in FIG. 14, each of the base station 10 and the user equipment UE may physically be configured as a computer device that includes a processor 1001, a memory 1002, a storage 1003, a communication device 1004, an input device 1005, an output device 1006, a bus 1007, and the like.

In the following description, the term "device" can be replaced with a circuit, a device, a unit, or the like. The hardware configuration of each of the base station 10 and the user equipment UE may be configured to include one or more devices (units) illustrated in the drawing or may be configured without including some devices.

Each function in each of the base station 10 and the user equipment UE is implemented such that predetermined software (program) is read on hardware such as the processor 1001 and the memory 1002, and the processor 1001 performs an operation and controls communication by the communication device 1004 and reading and/or writing of data in the memory 1002 and the storage 1003.

For example, the processor 1001 operates an operating system and controls the entire computer. The processor 1001 may be constituted by a central processing unit (CPU: Central Processing Unit) including an interface with a peripheral device, a control device, an operation device, a register and the like.

Further, the processor 1001 reads a program (a program code), a software module, and data from the storage 1003 and/or the communication device 1004 out to the memory 1002, and performs various kinds of processes according to them. As the program, a program causing a computer to execute at least some of the operations described in the above embodiment is used. For example, the signal transmission unit 101, the signal reception unit 102, the configuration information management unit 103, and the timing adjustment unit 104 of the user equipment UE shown in FIG. 12 may be implemented by a control program which is stored in the memory 1002 and operates on the processor 1001. Further, for example, the signal transmission unit 201, the signal reception unit 202, the configuration information management unit 203, and the timing instruction unit 204 of the base station 10 shown in FIG. 13 may be implemented by a control program which is stored in the memory 1002 and operates on the processor 1001. Various kinds of processes have been described as being performed by one processor 1001 or may be simultaneously or sequentially performed by two or more processors 1001. The processor 1001 may be implemented by one or more chips. The program may be transmitted from a network via an electric communication line.

The memory 1002 is a computer readable recording medium and configured with at least one of a read only memory (ROM), an erasable programmable ROM (EPROM), an electrically erasable programmable ROM (EEPROM), a random access memory (RAM), and the like. The memory 1002 is also referred to as a "register," a "cache," a "main memory," or the like. The memory 1002 can store programs (program codes), software modules, data or the like which are executable for carrying out the processes described in the present embodiment.

The storage 1003 is a computer-readable recording medium and may be configured with, for example, at least one of an optical disk such as a compact disc ROM (CD-ROM), a hard disk drive, a flexible disk, a magneto-optical disk (for example, a compact disk, a digital versatile disk, or a Blu-ray (registered trademark) disc, a smart card, a flash memory (for example, a card, a stick, or a key drive), a floppy (registered trademark) disk, a magnetic strip, and the like. The storage 1003 is also referred to as an "auxiliary storage device." The storage medium may be, for example, a database, a server, or any other appropriate medium including the memory 1002 and/or the storage 1003.

The communication device 1004 is hardware (a transceiving device) for performing communication with computers via a wired and/or wireless network and is also referred to as a "network device," a "network controller," a "network card," a "communication module," or the like. For example, the signal transmission unit 101 and the signal reception unit 102 of the user equipment UE may be implemented by the communication device 1004. Further, the signal reception unit 201 and the signal transmission unit 202 of the base station 10 may be implemented by the communication device 1004.

The input device 1005 is an input device that receives an input from the outside (such as a keyboard, a mouse, a microphone, a switch, a button, a sensor, or the like). The output device 1006 is an output device that performs an output to the outside (for example, a display, a speaker, an LED lamp, or the like). The input device 1005 and the output device 1006 may be integratedly configured (for example, a touch panel).

The respective devices such as the processor 1001 and the memory 1002 are connected via the bus 1007 to communicate information with each other. The bus 1007 may be configured with a single bus or may be configured with different buses between the devices.

Further, each of the base station 10 and the user equipment UE may be configured to include hardware such as a microprocessor, a digital signal processor (DSP), an application specific integrated circuit (ASIC), a programmable logic device (PLD), or a field programmable gate array (FPGA) or all or some of the functional blocks may be implemented by hardware. For example, the processor 1001 may be implemented by at least one of these pieces of hardware.

Summary of the Embodiment

As described above, according to the present embodiment, there is provided a user equipment in a radio communication system including a base station and the user equipment, including: a signal transmission unit that transmits an uplink signal to the base station; a signal reception unit that receives a downlink signal from the base station; and a timing adjustment unit that performs timing control to shift a transmission timing of an uplink signal to be transmitted from the signal transmission unit forward using a reception timing of a downlink signal received by the signal reception unit as a reference, wherein the timing adjustment unit executes the timing control in a serving cell using an offset value independent of a duplex mode of the serving cell.

According to the above-configuration, there is provided a technique for enabling uplink transmission timing control without being conscious of a duplex mode in a radio communication system.

When a frequency range of a band of the serving cell is a first range, the timing adjustment unit uses a first value as the offset value, and when a frequency range of a band of the serving cell is a second range, the timing adjustment unit uses a second value as the offset value. According to this configuration, a proper offset value can be applied in frequency ranges such as FR1 and FR2, for example.

The timing adjustment unit determines whether the band of the serving cell is a predetermined band or not based on system information or a synchronization signal transmitted from the base station, and determines the offset value to use depending on whether the band of the serving cell is a predetermined band or not. According to this configuration, a proper offset value can be applied depending on characteristics of bands.

The predetermined band is a band that can be used by each of a user equipment supporting a first radio access technology and a user equipment supporting a second radio access technology. According to this configuration, for example, a proper offset value can be applied depending on whether or not the band of the serving cell is LTE-NR coexistence band.

Supplement of Embodiments

While the embodiment of the present invention has been described, the disclosed invention is not limited to such an embodiment, and various variations, modifications, alterations, and substitutions could be conceived by those skilled in the art. While specific examples of numerical values are used in order to facilitate understanding of the invention, these numerical values are examples only and any other appropriate values may be used unless otherwise stated particularly. The classification of items in the description is not essential in the present invention, and features described in two or more items may be used in combination, and a feature described in a certain item may be applied to a feature described in another item (unless contradiction occurs). It is not always true that the boundaries of the functional units or the processing units in the functional block diagram correspond to boundaries of physical components. The operations of a plurality of functional units may be physically performed by a single component. Alternatively, the operations of the single functional unit may be physically performed by a plurality of components. The orders in the sequence and the flowchart described in the embodiment may be switched unless contradiction occurs. For convenience of explanation of processing, the user equipment UE and the base station 10 have been explained using functional block diagrams. However, these devices may be implemented by hardware, software, or a combination thereof. The software that operates by a processor included in the user equipment UE according to the embodiment of the present invention and the software that operates by a processor included in the base station 10 according to the embodiment of the present invention may be stored in a random access memory (RAM), a flash memory, a read only memory (ROM), an EPROM, an EEPROM, a register, a hard disk (HDD), a removable disk, a CD-ROM, a database, a server, and other appropriate storage media.

Transmission of the information is not limited to the aspects/embodiments described in the invention, but may be performed by other methods. For example, transmission of the information may be performed by physical layer signaling (such as downlink control information (DCI) or uplink control information (UCI)), upper layer signaling (such as radio resource control (RRC) signaling, medium access control (MAC) signaling, broadcast information (such as a master information block (MIB) or a system information block (SIB)), other signaling, or a combination thereof. The RRC message may be referred to as RRC signaling. An RRC message may be, for example, an RRC connection setup message or an RRC connection reconfiguration message.

The aspects/embodiments described in this specification may be applied to systems employing long term evolution (LTE), LTE-advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), or other appropriate systems and/or next-generation systems to which the systems are extended.

The processing procedures, sequences, flowcharts and the like of the aspects/embodiments described above in this specification may be changed in the order as long as they are not incompatible with each other. For example, in the methods described in this specification, various steps as elements are described in an exemplary order and the methods are not limited to the described order.

Specific operations which are performed by the base station 10 in this specification may be performed by an upper node thereof in some cases. In a network including one or more network nodes including a base station, various operations which are performed to communicate with a user equipment UE can be apparently performed by the base station and/or network nodes (for example, an MME or an S-GW can be considered but the network nodes are not limited thereto) other than the base station. A case in which the number of network nodes other than the base station is one has been described above, but a combination of plural different network nodes (for example, an MME and an S-GW) may be used.

The aspects described in this specification may be used alone, may be used in combination, or may be switched with implementation thereof.

The user equipment UE may also be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or several appropriate terms by those skilled in the art.

The base station 10 may be referred to as an NodeB (NB), an enhanced NodeB (eNB), a base station, or some other appropriate terms by those skilled in the art.

The terms "determining (determining)" and "deciding (determining)" used in this specification may include various types of operations. For example, "determining" and "deciding" may include deeming that to perform judging, calculating, computing, processing, deriving, investigating, looking up (e.g., search in a table, a database, or another data structure), or ascertaining is to perform "determining" or "deciding". Furthermore, "determining" and "deciding" may include deeming that to perform receiving (e.g., reception of information), transmitting (e.g., transmission of information), input, output, or accessing (e.g., accessing data in memory) is to perform "determining" or "deciding". Furthermore, "determining" and "deciding" may include deeming that to perform resolving, selecting, choosing, establishing, or comparing is to perform "determining" or "deciding". Namely, "determining" and "deciding" may include deeming that some operation is to perform "determining" or "deciding".

An expression "on the basis of ~" which is used in this specification does not refer to only "on the basis of only~," unless apparently described. In other words, the expression "on the basis of ~" refers to both "on the basis of only~" and "on the basis of at least ~."

So long as terms "include" and "including" and modifications thereof are used in this specification or the appended claims, the terms are intended to have a comprehensive meaning similar to a term "comprising." A term "or" which is used in this specification or the claims is intended not to mean an exclusive or.

In the entire disclosure, for example, when an article such as a, an, or the is added in translation into English, such an article refers to including the plural unless otherwise recognized from the context.

Although details of the present invention have been described, it is clear for the person skilled in the art that the invention is not limited to the above-mentioned embodiments in the description. The present invention can be implemented as modifications and changed forms without departing from the spirit and scope of the present invention as defined by the scope of the claims. Therefore, the description of the present specification is for the purpose of illustration and does not have any restrictive meaning to the present invention.

DESCRIPTION OF REFERENCE SIGNS

101 signal transmission unit
102 signal reception unit
103 configuration information management unit
104 timing adjustment unit
201 signal transmission unit
202 signal reception unit
203 configuration information management unit
204 timing instruction unit
1001 processor
1002 memory
1003 storage
1004 communication device
1005 input device
1006 output device

The invention claimed is:

1. A terminal comprising:
   a transmitter that performs uplink transmission; and
   a processor that adjusts timing of the uplink transmission with respect to a downlink reception timing,
   wherein, when a band of a cell in which uplink transmission is performed is not a band that can be used by each of a terminal supporting a first radio access technology and a terminal supporting a second radio access technology, the processor adjusts the timing by using a same offset value when a duplex mode of the band of the cell is frequency division duplex (FDD) and when the duplex mode of the band of the cell is time division duplex (TDD), and
   wherein, when the band of the cell is the band that can be used by each of the terminal supporting the first radio access technology and the terminal supporting the second radio access technology, an offset value when a duplex mode of the band of the first radio access technology is FDD is different from an offset value when a duplex mode of the band of the first radio access technology is TDD.

2. The terminal as claimed in claim 1, wherein, when a frequency range of the band of the cell is a first range which is different from a second range, the processor uses a first value as the same offset value.

3. The terminal as claimed in claim 2, wherein, when the band of the cell is the band that can be used by each of the terminal supporting the first radio access technology and the terminal supporting the second radio access technology, the processor adjusts the timing by using an offset value that is different from the same offset value.

4. The terminal as claimed in claim 1, wherein, when the band of the cell is the band that can be used by each of the terminal supporting the first radio access technology and the terminal supporting the second radio access technology, the processor adjusts the timing by using an offset value that is different from the same offset value.

5. A base station comprising:
   a transmitter that performs downlink transmission; and
   a receiver that receives uplink transmission in which timing of the uplink transmission is adjusted with respect to a downlink reception timing at a terminal, wherein, when a band of a cell in which uplink transmission is performed by the terminal is not a band that can be used by each of a terminal supporting a first radio access technology and a terminal supporting a second radio access technology, the timing is adjusted by using a same offset value when a duplex mode of the band of the cell is frequency division duplex (FDD) and when the duplex mode of the band of the cell is time division duplex (TDD), and wherein, when the band of the cell is the band that can be used by each of the terminal supporting the first radio access technology and the terminal supporting the second radio access technology, an offset value when a duplex mode of the band of the first radio access technology is FDD is different from an offset value when a duplex mode of the band of the first radio access technology is TDD.

6. An uplink transmission timing adjustment method executed by a terminal, comprising:
   a timing adjustment step of adjusting timing of uplink transmission performed by the terminal with respect to a downlink reception timing,
   wherein, in the timing adjustment step, when a band of a cell in which uplink transmission is performed is not a band that can be used by each of a terminal supporting a first radio access technology and a terminal supporting a second radio access technology, the terminal adjusts the timing by using a same offset value when a duplex mode of the band of the cell is frequency division duplex (FDD) and when the duplex mode of the band of the cell is time division duplex (TDD), and
   wherein, when the band of the cell is the band that can be used by each of the terminal supporting the first radio access technology and the terminal supporting the second radio access technology, an offset value when a duplex mode of the band of the first radio access technology is FDD is different from an offset value when a duplex mode of the band of the first radio access technology is TDD.

7. A radio communication system comprising:
a terminal comprising:
   a transmitter of the terminal that performs uplink transmission;
   a processor that adjusts timing of the uplink transmission with respect to a downlink reception timing,
   wherein, when a band of a cell in which uplink transmission is performed is not a band that can be used by each of a terminal supporting a first radio access technology and a terminal supporting a second radio access technology, the processor adjusts the timing by using a same offset value when a duplex mode of the band of the cell is frequency division duplex (FDD) and when the duplex mode of the band of the cell is time division duplex (TDD), and
   wherein, when the band of the cell is the band that can be used by each of the terminal supporting the first radio access technology and the terminal supporting the second radio access technology, an offset value when a duplex mode of the band of the first radio access technology is FDD is different from an offset value when a duplex mode of the band of the first radio access technology is TDD, and
a base station comprising:
   a transmitter of the base station that performs downlink transmission; and
   a receiver that receives uplink transmission in which timing of the uplink transmission is adjusted with respect to downlink reception timing at the terminal.

* * * * *